(12) United States Patent
Bromley et al.

(10) Patent No.: US 10,043,222 B1
(45) Date of Patent: Aug. 7, 2018

(54) SYSTEM AND METHOD FOR ADAPTIVELY OPTIMIZED RECOMPOSITION OF PARTS LIST FOR FABRICATION OF ELECTRONIC CIRCUIT PRODUCT

(71) Applicant: CADENCE DESIGN SYSTEMS, INC., San Jose, CA (US)

(72) Inventors: Matt Bromley, Portland, OR (US); Rajesh Khanna, Nashua, NH (US)

(73) Assignee: Cadence Design Systems, Inc., San Jose, CA (US)

( * ) Notice: Subject to any disclaimer, the term of this patent is extended or adjusted under 35 U.S.C. 154(b) by 895 days.

(21) Appl. No.: 14/493,015

(22) Filed: Sep. 22, 2014

(51) Int. Cl.
   *G06Q 10/08* (2012.01)
   *G06F 17/50* (2006.01)
   *G06Q 50/04* (2012.01)
   *G05B 13/02* (2006.01)

(52) U.S. Cl.
   CPC ............. *G06Q 50/04* (2013.01); *G05B 13/02* (2013.01)

(58) Field of Classification Search
   CPC .................................. G06Q 50/04; G05B 13/02
   USPC ......................................................... 700/107
   See application file for complete search history.

(56) References Cited

U.S. PATENT DOCUMENTS

| | | | | |
|---|---|---|---|---|
| 6,412,012 B1 * | 6/2002 | Bieganski | ............. | G06Q 30/02 709/232 |
| 7,343,212 B1 * | 3/2008 | Brearley | ............. | G06Q 10/087 700/106 |
| 7,702,636 B1 * | 4/2010 | Sholtis | ............. | G06F 17/30566 707/999.1 |
| 2002/0138316 A1 * | 9/2002 | Katz | ............. | G06Q 10/06311 705/7.13 |
| 2006/0120401 A1 * | 6/2006 | Harada | ............. | G06Q 10/087 370/465 |
| 2008/0189260 A1 * | 8/2008 | Arnold | ............. | G06F 17/30265 |
| 2010/0131343 A1 * | 5/2010 | Hamilton, II | ...... | G06Q 30/0222 705/14.23 |

(Continued)

OTHER PUBLICATIONS

Kendall, "Handling Substitutions in Bills of Materials", Mar. 10, 2005, pp. 3.*

(Continued)

*Primary Examiner* — Miranda M Huang
*Assistant Examiner* — Olvin Lopez Alvarez
(74) *Attorney, Agent, or Firm* — Rosenberg, Klein & Lee

(57) ABSTRACT

A system and method are provided for adaptively optimized recomposition of a parts list for fabrication of an electronic circuit product. A parts list acquisition portion forms a parts list containing a plurality of constituent parts entries read from one or more predetermined sources. The parts entries are respectively identified in the parts list by different corresponding part identifiers. An optimization unit coupled to the parts list acquisition unit comparatively determines mutual matching between different parts entries based on at least one optimization parameter. The optimization unit intermediately recomposes the parts list by incorporating one or more suggested parts substitutions to adaptively consolidate mutually matched pairs of parts entries. A results exploration unit coupled to the optimization unit actuates a user interface portion to render the intermediately recomposed parts list, and alternatively incorporates or discards the suggested parts substitutions responsive to user input, to generate a fully recomposed parts list.

17 Claims, 17 Drawing Sheets

(56) References Cited

U.S. PATENT DOCUMENTS

| | | | | |
|---|---|---|---|---|
| 2011/0098837 A1* | 4/2011 | Yucel | ................. | G06F 17/5086 |
| | | | | 700/104 |
| 2011/0161209 A1* | 6/2011 | Boyd | .................... | G06Q 10/06 |
| | | | | 705/29 |
| 2014/0364985 A1* | 12/2014 | Tiwari | ............... | G06Q 10/0875 |
| | | | | 700/107 |

OTHER PUBLICATIONS

Hart, "Creating and Optimizing a Bill of Materials", Mar. 12, 2015, pp. 8.*

Ip.com, "Application That Optimizes Method of Obtaining Items From a Shopping List", Feb. 22, 2013, pp. 6.*

* cited by examiner

Optimization

— 2060

| PART_NUMBER | Suggested Part | Value 123 392-701 | ±7 984 % COST |
|---|---|---|---|
| 3198B0000 | | | 392 133 |
| 3198G0000 | | | 423 10 |
| 3391B0000 | | | 481 10 |
| 3124C0000 | | | 516 38 |
| 3144A0009 | | | 528 50 |
| 3124G0000 | | | 601 12 |
| 3392B0000 | | | 604 105 |
| 3144A0002 | | | 622 18 |
| 3129I0000 | | | 650 193 |
| 3132C0050 | | | 655 194 |

| PART_NUMBER | Suggested Part | Value | COST |
|---|---|---|---|
| 3198B0000 | | 392 | 133 |
| 3198G0000 | | 423 | 10 |
| 3391B0000 | | 481 | 10 |
| 3124C0000 | | 516 | 38 |
| 3144A0009 | 3124C0000 | 528 | 50 |
| 3124G0000 | 3144A0002 | 601 | 12 |
| 3392B0000 | 3144A0002 | 604 | 105 |
| 3144A0002 | | 622 | 18 |
| 3129I0000 | 3144A0002 | 650 | 193 |
| 3132C0050 | | 655 | 194 |
| 3151AB000 | 3132C0050 | 689 | 67 |
| 3151AC000 | | 701 | 43 |

Figure 3:
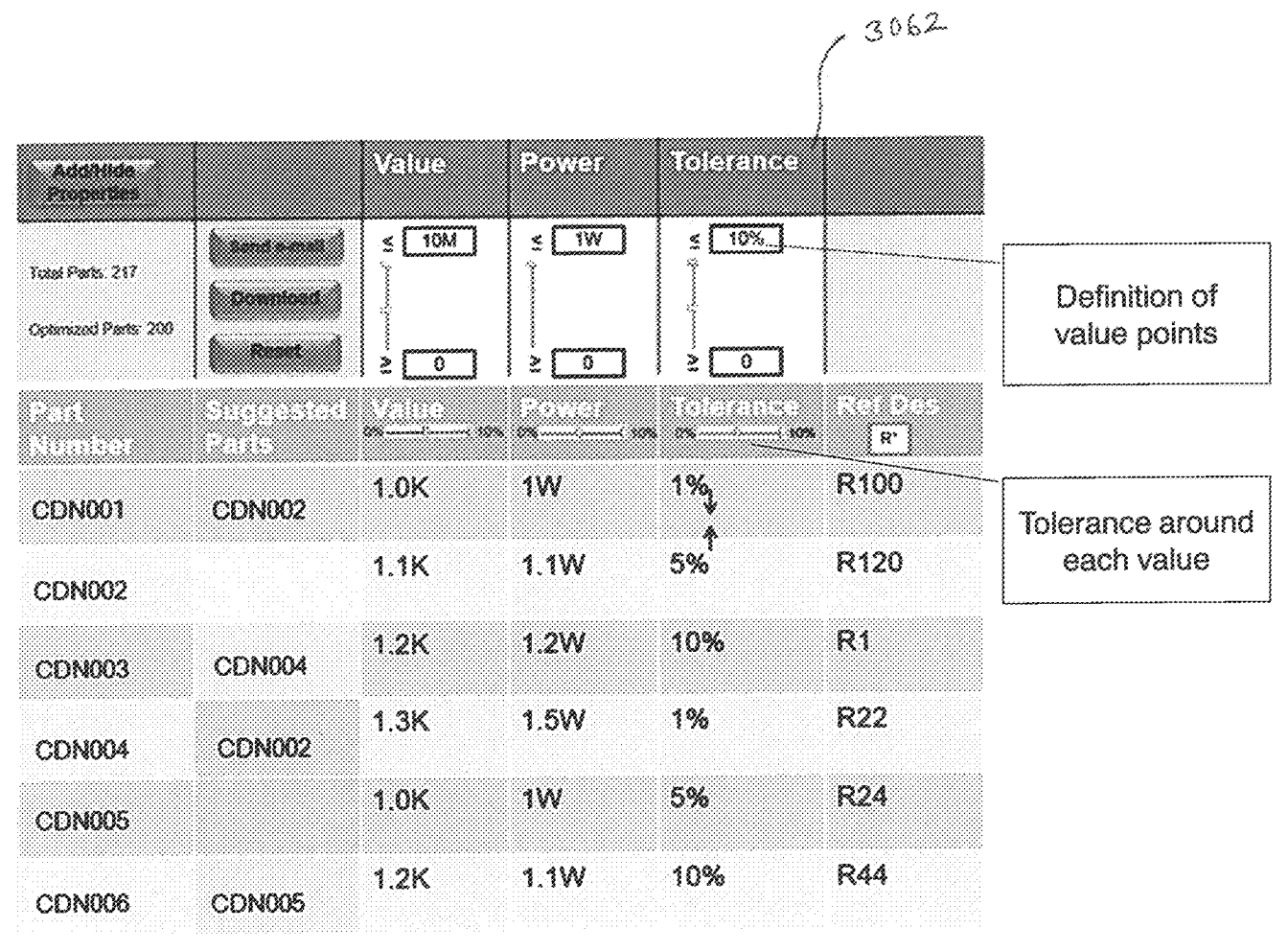

| P/N Number | Suggested Part | Value | Power | Tolerance | Package |
|---|---|---|---|---|---|
| CDN001 | CDN002 | 1.0K | 1W | 1% | R100 |
| CDN002 | | 1.1K | 1.1W | 5% | R120 |
| CDN003 | CDN004 | 1.2K | 1.2W | 10% | R1 |
| CDN004 | CDN002 | 1.3K | 1.5W | 1% | R22 |
| CDN005 | | 1.0K | 1W | 5% | R24 |
| CDN006 | CDN005 | 1.2K | 1.1W | 10% | R44 |

Definition of value points

Tolerance around each value

Total Parts: 217
Optimized Parts: 200

| Part Number | Suggested Parts | Value | Power | Description |
|---|---|---|---|---|
| PN0 |  | 100 | 5 | D0 |
| PN1 |  | 112 | 7 | D1 |
| PN2 |  | 113 | 8 | D2 |
| PN3 |  | 113 | 10 | D3 |
| PN4 |  | 120 | 12 | D4 |
| PN5 | PN6 | 122 | 14 | D5 |
| PN6 |  | 127 | 15 | D6 |
| PN7 | PN6 | 128 | 16 | D7 |
| PN8 | PN6 | 130 | 16 | D8 |
| PN9 | PN6 | 132 | 16 | D9 |

FIG. 4

| Part Number | Value | Tolerance | Cost |
|---|---|---|---|
| CDN001 | 10K | 5% | 0.02 |
| CDN002 | 10.2K | 5% | 0.02 |
| CDN003 | 10.5K | 1% | 0.01 |
| CDN004 | 10.7K | 1% | 0.02 |
| CDN005 | 11.5K | 5% | 0.04 |
| CDN006 | 13.0K | 1% | 0.04 |
| CDN007 | 13.3K | 5% | 0.01 |
| CDN008 | 60.4K | 5% | 0.02 |
| CDN009 | 62K | 5% | 0.02 |
| CDN010 | 68K | 5% | 0.01 |
| CDN011 | 75K | 5% | 0.02 |

FIG. 5A

BoM With Suggestions

| PART_NUMBER | Suggested Part | Value | Tol | COST |
|---|---|---|---|---|
| CDN001 | CDN002 | 10K | 5% | 0.02 |
| CDN002 | | 10.2K | 5% | 0.02 |
| CDN003 | CDN002 | 10.5K | 1% | 0.01 |
| CDN004 | CDN002 | 10.7K | 1% | 0.02 |
| CDN005 | | 11.5K | 5% | 0.04 |
| CDN006 | | 13.0K | 1% | 0.04 |
| CDN007 | CDN006 | 13.3K | 5% | 0.01 |
| CDN008 | | 60.4K | 5% | 0.02 |
| CDN009 | CDN008 | 62K | 5% | 0.02 |
| CDN010 | | 68K | 5% | 0.01 |
| CDN011 | | 75K | 5% | 0.02 |

Completely Optimized BoM

| PART_NUMBER | Value | Tol | COST |
|---|---|---|---|
| CDN002 | 10.2K | 5% | 0.02 |
| CDN005 | 11.5K | 5% | 0.04 |
| CDN006 | 13.0K | 1% | 0.04 |
| CDN008 | 60.4K | 5% | 0.02 |
| CDN010 | 68K | 5% | 0.01 |
| CDN011 | 75K | 5% | 0.02 |

| PART_NUMBER | Suggested Part | Value | Tol | COST |
|---|---|---|---|---|
| CDN001 | | 10K | 5% | 0.02 |
| CDN002 | CDN001 | 10.2K | 5% | 0.02 |
| CDN003 | | 10.5K | 1% | 0.01 |
| CDN004 | CDN003 | 10.7K | 1% | 0.02 |
| CDN005 | | 11.5K | 5% | 0.04 |
| CDN006 | | 13.0K | 1% | 0.04 |
| CDN007 | | 13.3K | 5% | 0.01 |
| CDN008 | | 60.4K | 5% | 0.02 |
| CDN009 | CDN008 | 62K | 5% | 0.02 |
| CDN010 | | 68K | 5% | 0.01 |
| CDN011 | | 75K | 5% | 0.02 |

BoM With Suggestions

| PART_NUMBER | Value | Tol | COST |
|---|---|---|---|
| CDN001 | 10K | 5% | 0.02 |
| CDN003 | 10.5K | 1% | 0.01 |
| CDN005 | 11.5K | 5% | 0.04 |
| CDN006 | 13.0K | 1% | 0.04 |
| CDN007 | 13.3K | 5% | 0.01 |
| CDN008 | 60.4K | 5% | 0.02 |
| CDN010 | 68K | 5% | 0.01 |
| CDN011 | 75K | 5% | 0.02 |

Completely Optimized BoM

SYSTEM AND METHOD FOR ADAPTIVELY OPTIMIZED RECOMPOSITION OF PARTS LIST FOR FABRICATION OF ELECTRONIC CIRCUIT PRODUCT

BACKGROUND OF THE INVENTION

The subject system and method are generally directed to adaptively optimized recomposition of at least a portion of a parts list generated for the fabrication of a given electronic circuit design. More specifically, the subject system and method provide for the automatic optimization of the given parts list based on certain preselected criteria to generate a recomposed version of the parts list having a reconstituted set of parts to be incorporated into an electronic circuit product embodying the design. Various efficiencies in terms of cost, manufacturing processes, simplicity of design, or the like are thereby realized.

SUMMARY OF THE INVENTION

It is an object of the present invention to provide a system and method for automatically recomposing a parts list for an electronic circuit design in order to remove various cost, manufacturing, or other inefficiencies deriving therefrom.

It is another object of the present invention to provide a system and method for executing such automatic recomposition in a manner that optimally consolidates different part numbers to minimize the number of disparate parts for a part list's constituent parts.

It is yet another object of the present invention to provide a system and method for carrying out a design cycle for an electronic circuit product which incorporates such parts list optimization.

It is still another object of the present invention to provide a system and method for collaborative optimization of a parts list based on considerations at different stages of a product design cycle.

These and other objects are attained in a system for adaptively optimized recomposition of a parts list for fabrication of an electronic circuit product. The system includes a parts list acquisition portion executing on a processor to form a parts list containing a plurality of constituent parts entries read from one or more predetermined sources. The parts entries are respectively identified in the parts list by different corresponding part numbers or other suitable identifiers. An optimization unit is coupled to the parts list acquisition unit, which optimization unit executes on a processor to comparatively determine mutual matching between different ones of the parts entries based on at least one optimization parameter. The optimization unit intermediately recomposes the parts list by incorporating therein one or more suggested parts substitutions to adaptively consolidate mutually matched pairs of the parts entries. A results exploration unit is coupled to the optimization unit, and actuates a user interface portion to render the intermediately recomposed parts list generated by the optimization unit. The exploration unit alternatively incorporates or discards each of the suggested parts substitutions in the intermediately recomposed parts list responsive to user input to generate a fully recomposed parts list.

A method implemented in accordance with certain embodiments of the present invention provides for adaptively optimized recomposition of a parts list for fabrication of an electronic circuit product. The method includes executing a processor to form a parts list containing a plurality of constituent parts entries acquired from one or more predetermined sources. The parts entries are respectively identified in the parts list by different corresponding part identifiers. The method further includes executing a processor to adaptively optimize the parts list, the optimization including comparatively determining mutual matches between different ones of the parts entries based on at least one optimization parameter. The parts list is intermediately recomposed by incorporating therein one or more suggested parts substitutions to adaptively consolidate mutually matched pairs of the parts entries. A user interface portion is actuated to render the intermediately recomposed parts list; whereupon the intermediately recomposed parts list as rendered is explored to alternatively incorporate or discard each of the suggested parts substitutions therein responsive to user input. A fully recomposed parts list is generated based on the exploration of the intermediately recomposed parts list.

A system implemented in accordance with certain embodiments of the present invention provides for designing an electronic circuit product. The system includes an optimization portion having an optimization unit executing on a processor for adaptively optimized recomposition of a parts list containing a plurality of constituent parts entries passed thereto. The optimization unit executes to comparatively determine mutual matching between different ones of the parts entries based on at least one preselected optimization parameter. The optimization unit intermediately recomposes the parts list by incorporating therein one or more suggested parts substitutions to adaptively consolidate mutually matched pairs of the parts entries. The optimization portion further includes a results exploration unit coupled to the optimization unit, which results exploration unit actuates a user interface portion to render the intermediately recomposed parts list generated by the optimization unit. The exploration unit alternatively incorporates or discards each of the suggested parts substitutions in the intermediately recomposed parts list responsive to user input to generate a fully recomposed parts list. The system also includes a parts list acquisition portion executing on a processor to form a preliminary parts list containing a plurality of preliminary parts entries read from one or more predetermined sources. The preliminary parts entries are respectively identified in the preliminary parts list by different corresponding part numbers, with the parts list acquisition portion executing to pass the preliminary parts list to the optimization portion for optimization thereby. A schematic design portion coupled to the optimization portion to receive therefrom a recomposition of the preliminary parts list and generate a schematic design of the electronic circuit product. The schematic design portion generates a first bill of materials for the schematic design containing a plurality of first parts entries. The schematic design portion executes to pass the first bill of materials to the optimization portion for optimization thereby. A layout design portion is coupled to the optimization portion to receive therefrom a recomposition of the first bill of materials and generate a physical layout design of the electronic circuit product. The layout design portion generates a second bill of materials for the physical layout design containing a plurality of second parts entries. The layout design portion executes to pass the second bill of materials to the optimization portion for optimization to generate an adaptive recomposition thereof.

BRIEF DESCRIPTION OF THE DRAWINGS

FIG. 2C is a graphic rendering of one example of a graphical user interface generated in connection with optimization parameter variance selection in a particular implementation of the embodiment of FIG. 2;

FIG. 2D is an annotated graphic rendering of the graphical user interface of FIG. 2C displaying results following a sample optimization run in a particular implementation of the embodiment of FIG. 2;

FIG. 2E illustrates a portion of a sample parts list recomposed following re-optimization of the sample optimization run illustrated in the graphical user interface of FIG. 2D, in a particular implementation of the embodiment of FIG. 2;

FIG. 3 is an annotated graphic rendering of another example of a graphical user interface generated in connection with optimization parameter variance selection in another implementation of the embodiment of FIG. 2;

FIG. 4 illustrates a portion of another sample parts list presenting a suggested recomposition resulting from an optimization carried out in yet another implementation of the embodiment of FIG. 2;

FIG. 5A illustrates a portion of a sample bill of materials listing parts and corresponding parameter values selected for optimization in still another implementation of the embodiment of FIG. 2;

FIG. 6A-1 is a schematic diagram illustrating a general flow of processes within a first stage of optimization executed by an optimization unit of the parts list optimization system embodiment of FIG. 2 in one exemplary implementation;

FIG. 6A-2 is a schematic diagram illustrating a flow of processes in connection with a specially marked part within a first stage of optimization executed by an optimization unit of the parts list optimization system embodiment of FIG. 2 in one exemplary implementation;

DETAILED DESCRIPTION OF THE PREFERRED EMBODIMENTS

Figure 1:
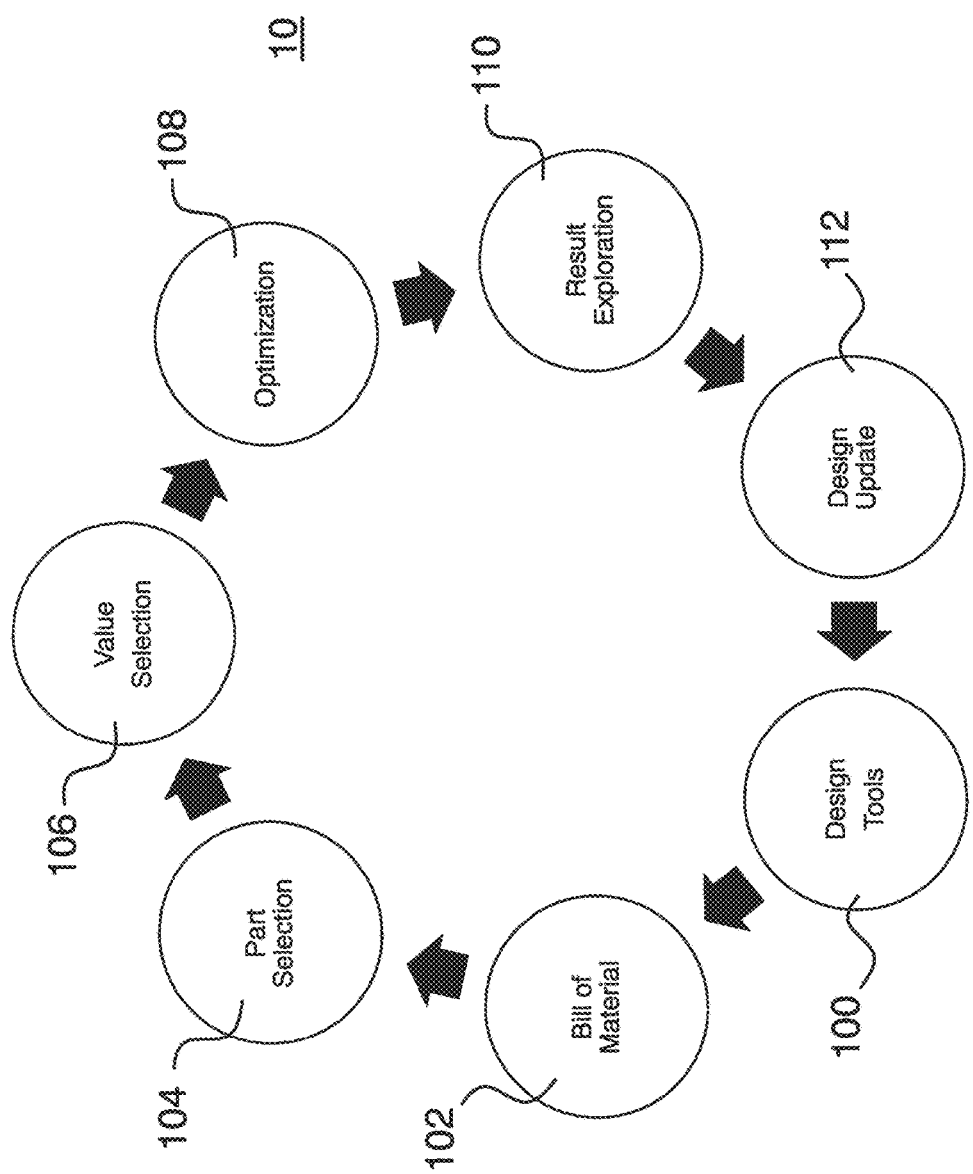
FIG. 1 is a schematic diagram illustrating a flow of processes carrying out a parts list optimization within a product design cycle in accordance with one exemplary embodiment of the present invention.

A necessary part of the process of actually fabricating an electronic circuit design is a list delineating the various chips, devices, components, and other such parts or materials for actually populating the circuit. A comprehensive list of these parts each identified by suitable number/identifier must be generated and maintained, particularly where the given electronic circuit is to be manufactured in quantities.

The given electronic circuit design may be embodied in a certain device, circuit board, or in any other product form known in the art. Taking a printed circuit board product as an example, the product design cycle begins generally with preparation of a schematic design. At some point, enough of the schematic design is defined to move on to physical design where physical layout is obtained through suitable processes to specify placement and routing of components on the board. Once the physical layout is obtained, manufacturing verification is carried out, after which a prototype of the circuit product is fabricated for subsequent manufacture in quantities.

The particular set of parts to be incorporated in a circuit product is generally identified in some form of a parts list. Parts in the set may be used in the circuit product in different quantities, but each different part remains uniquely identified by a suitable part number or other identifier in the parts list. Parts may be differentiated because they are of different type, or if of similar or like type, because they are different in mechanical or electrical properties (such as packaging features, parametric properties). The same uniquely identified part may occur multiple times in the parts list, though in various quantities. The same part may even be referenced using different additional designations in the parts list. Nonetheless, each occurrence of a unique part is consistently identified in the parts list by its identifier. In accordance with certain aspects of the present invention, a parts list is adaptively optimized by consolidating different unique parts (that is, differently identified parts as opposed to different occurrences/designations of the same part) where appropriate with suitable substitutions for certain parts identifiers. The terms 'part,' 'part number,' and 'part identifier' are used synonymously herein to denote a unique part, unless specifically noted otherwise.

A certain version of a parts list is often generated early in the circuit design cycle, typically once the circuit design is schematically defined, but in certain cases even before schematic definition if sufficient product information is available to obtain a preliminary parts list (such as a strategic parts list described for example herein). Subsequent versions may refine and update the parts list as the design cycle progresses, until a final version of the parts list, such as the so-called bill of materials (BOM), is adopted for actual fabrication. All the different parts that need to be installed, soldered, and otherwise integrated onto a substrate (such as a printed circuit board)—through a board population process, for instance—are each delineated in the BOM by identifying number and quantity.

How efficiently a circuit product may be manufactured depends on a number of factors. Amongst the most determinative of factors are not only the overall quantities of constituent parts, but also the number of differently identified parts that must be acquired and worked with. Significant cost reductions may be found if occurrences of similar but different parts having different identifier (different because of differences in physical footprint due to size and shape, in electrical properties, in tolerances, in power capacity, or the like) may be unified so that each occurrence is of the same part. While the total number of parts may remain the same in that instance, the number of differently identified parts will have been reduced. This tends to yields to savings in terms of both cost and manufacturing simplicity.

Supply arrangements that users have with different parts suppliers, for instance, may offer favorable pricing for certain parts over others. The flexibility to replace higher cost parts with such favorably priced substitutes without undue negative impact on the circuit design would yield cost savings. That flexibility would also afford greater opportunities for bulk acquisition of certain parts, hence lower acquisition cost per part. The acquisition process would be simplified, as fewer different parts would necessitate fewer purchase order transactions to carry out and manage.

Moreover, automated assembly processes for circuit products employ automated manufacturing line equipped to handle limited numbers of different parts. If the different parts limit is exceeded for one line, the product under manufacture must either be run through again through the same or different line having appropriate reconfiguration. The multiple, differently configured runs add delay, complexity, and expense to the manufacturing process. Keeping the number of different parts within the limit would avoid such process costs.

If this number of different parts were kept within the applicable limit, an automatic population/assembly machine, for example, need not be filled/stocked with one set of parts for one run configuration, then re-stocked with a different set of parts for another run configuration. Instead, the machine may be stocked once with greater quantities of certain unified parts so that it may more efficiently populate the given board (or other substrate) in one combined run.

In accordance with certain aspects of the present invention, the subject system and method generally provide for automated re-constitution of a parts list so that different constituent parts may be optimally unified where permissible. The subject system and method adaptively recompose the parts list in this manner according to predetermined design parameters defining certain optimization properties. The subject system and method are preferably implemented in an iterative parts list optimization flow which enables the collaborative interaction between design and implementation processes for efficient fabrication of a circuit product.

Briefly, a system formed in accordance with one exemplary embodiment of the present invention preferably carries out design time optimization that begins early in the design cycle—for example, during logic design processes, even before physical design processes have occurred. Measures are provided whereby a user may select the parts (or types of parts) to provide optimization for, and the particular properties on which to base the optimization. Regarding the parts to optimize, a parts list may include core functional elements like CPU's, memory controllers, and others which are sufficiently defining for the circuit product in question to be less fungible than, say, passive discrete components like resistors, capacitors, and inductors, and the like. While optimization is not limited to discrete components, it is preferably carried out on such components as they tend to be the most fungible of part types, and most readily characterized by defining parameter values.

Footprint Optimization

Regarding the properties over which to optimize the selected parts, optimization is preferably carried out at two main levels: according to physical footprint and according to certain values of parameters or properties. Optimizing a list of parts according to a common footprint references the physical geometric features of each part in question—its 'land pattern,' or the part's actual shape when situated on the given circuit board. For example, many electronic parts, particularly discrete passive components, have considerably different footprint shapes and sizes on the board though they may have like electrical properties. Board real estate and other physical/mechanical property considerations, therefore, tend to limit the range of suitable replacements for a given part. Footprint optimization screens seeks to unify to the extent possible those parts having closely similar footprints and provides one or more alternate part numbers as possible substitutes. A substitute part is preferably though not necessarily drawn from a similar part already included in the parts list.

Certain footprint requirements of constituent parts are largely defined at the schematic phase of a circuit product's design cycle, where the interconnected components are typically already identified by selected part numbers. The physical properties of these components are thereby carried into the design. A schematic design's definition of interconnection paths between these physical components then intrinsically establishes a certain fit, form, and function between them on a circuit board—which effectively dictate the physical footprint.

It is normally not advisable to disturb the footprint (to the extent it has been established by the schematic design) during later phases/stages of the design cycle. Indeed, doing so may be quite harmful to the design, since the various considerations originally factoring into the schematic may not be fully apparent or available at the later design cycle stages. Thus, footprint optimization serves effectively to manage alternate footprints used for different functionality, without significantly modifying the size of parts' footprints established in connection with schematic design. For example, if numerous different resistors having somewhat similar though not identical footprints have been included at schematic design, footprint optimization executes to seek a common footprint for them if possible. Substitutions are generated for some of these resistors to reduce the necessary parts numbers required to populate the circuit board in this regard.

Values Optimization

Preferably, optimization based on certain types of parameter/property values is selectively configured to suit the particular needs of the intended application. In addition to the value of a given part's defining characteristic—like resistance for resistors, capacitance for capacitors, inductance for inductors, and the like—values of other predetermined parameters may be employed in this regard. Examples of other parametric values to optimize over include: power rating; voltage rating; tolerance (such as "+/−5%" of assigned resistance value, for example); quality factor (index or other quantitative or qualitative benchmark); procurement cost (price or other measure); and others.

In the case of multiple disparate resistor parts, for example, one may configure the optimization to execute only over resistance value and tolerance. On the other hand, in the case of multiple disparate capacitor parts, one may configure the optimization to execute over capacitance value and voltage rating.

Such values-based optimization generally seeks to consolidate, or unify, parts that of disparate number/identification—because of differences in type or differences in the parametric value(s) in question—by replacing one or more of the parts with a substitute part. The substitute part identifier is a common identifier shared with at least one other part contained in the list. Preferably, the optimization over each chosen parameter is selectively configured with, among other things, a particular degree of variance to allow in that parametric value for parts to share a common parts identifier.

If, for example, a 10 KΩ resistor part, a 9.8 KΩ resistor part, and a 10.4 KΩ resistor part were subjected to value optimization, setting the variance at 10% would unify all of these resistor parts into the same part number in the list, but with a quantity of 3. The part number of the 10 KΩ resistor part may be used as the substitute part number for the other two resistor parts in the recomposed parts list. This parts substitution effectively proposes 10% as an affordable design tradeoff. Since the answer to this question is normally best validated by the schematic design engineer, such optimization is preferably done early enough in the design cycle for meaningful consideration and validation of such design optimizing changes.

Occasionally, the proposed parts substitution may be rejected because certain parts may require very strict tolerance due to special design considerations. Variance from the parametric values prescribed may for instance impact the signal integrity analysis results too much to allow. The part number for that part may then be fixed, or locked, against substitution by the optimization process. It is preferable for these and other reasons to carry out design time optimization, so that the design engineering team is afforded ample opportunity for collaborative feedback in near real time, where the intended application permits.

The parts substitution obtained by value optimization is preferably presented for in the first instance as suggestions for consideration, as a proposed re-constitution of parts for recomposing a bill of materials, for instance. Conventional circuit products often entail complex designs, and it is in practice quite difficult to correlate results of such optimization obtained at the earlier stages of the design cycle with those obtained later in the design cycle. That is, a component engineer involved in a post physical layout stage is not equipped to safely authorize parts substitution for a circuit design initially prescribed by a design engineer involved at the early schematic design stage. The results of optimization, particularly the results of value optimization, are preferably returned to the design engineer for consideration of the proposed parts substitutions for adoption and incorporation into the given design. If necessary, further re-optimization may be carried out on the revised design. Productive collaboration towards efficient product design and fabrication between those involved in even far-removed stages of design is thereby induced.

Roll-Up Optimization

In accordance with certain aspects of the present invention, the disclosed parts list optimization may be carried out collectively over multiple designs. An aggregation of parts from multiple parts list may be examined to determine if they may be consolidated in part numbers across the multiple designs. This may be particularly useful where a group of PCB designs, for example, are provided to the same contract manufacturer for fabrication, for whom certain parts offer greater efficiencies irrespective of the particular PCB design in which they are incorporated. This roll-up optimization provides the ability to conduct optimization across all or a set of the boards provided to this common manufacturer by acquiring parts from a merged parts list, for potentially greater optimization due to the opportunity for aggregated purchasing and other such benefits.

Turning now to FIG. 1, there is shown a schematic diagram illustrating a general flow of processes 10 iteratively carrying out a parts list optimization within a product design cycle. As shown, the flow includes the use of one or more suitable design tools 100 to generate a parts list such as a BOM 102 listing the individual parts incorporated into the designed product when fabricated. These may include both electrical (such as active devices, passive components, storage elements, . . . ) and non-electrical products (such as board stiffener members for structural reinforcement, fastening elements, . . . ). A parts selection process 104 acquires from the BOM 102 a set of parts for possible optimization by consolidating, or unifying, occurrences of one or more different parts into corresponding occurrences of a common part.

A value selection process 106 follows by selectively setting at least one property or parameter (which may or may not be electrical in nature) of interest on which to base the consolidation/unification. This process preferably also entails the selective setting of certain criteria for restricting the property/parameter values to seek consolidation over, and the acceptable variation in such values in the parts being consolidated.

An optimization process 108 is executed accordingly on the selected set of parts, based on the selected property or parameter values. The optimization results present possible reconstitution of the BOM with certain consolidating substitutions of parts, but the design is not updated automatically according to these optimization results. The results are preferably subjected to a suitable review and exploration process 110 before acceptance. During process 110, the design engineer(s) may for example re-run certain simulations, or conduct certain signal integrity analyses in order to validate or reject the consolidating substitutions suggested by the optimization results. The changes validated and accepted by this exploration process 110 are then incorporated into the design at process 112 to accordingly update the design. The given design tools 100 are thereafter utilized at process 100 to recompose the BOM 102 to reflect the optimization.

Figure 2:
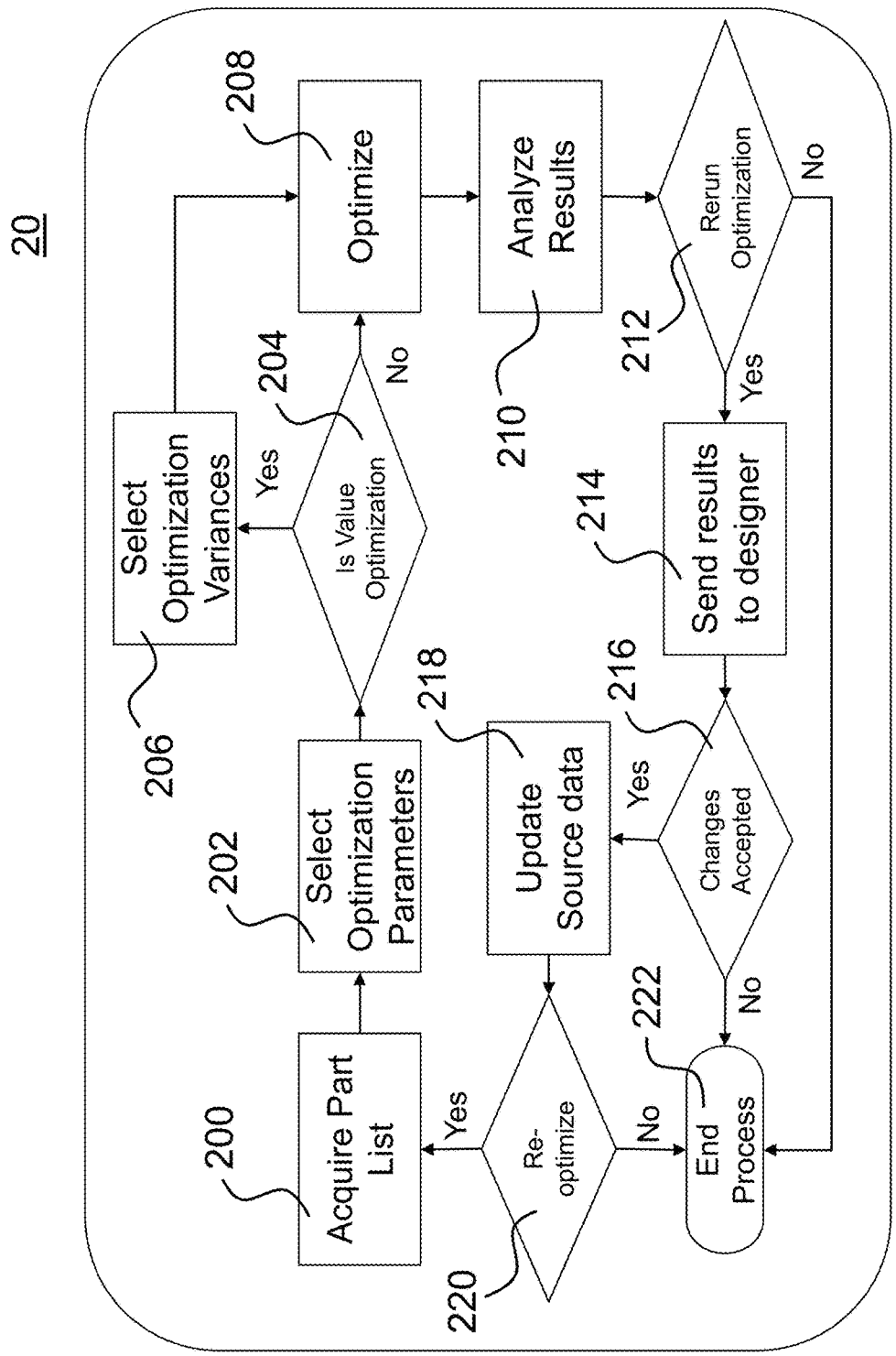
FIG. 2 is a schematic diagram generally illustrating a functional interaction of units in a parts list optimization system formed in accordance with one exemplary embodiment of the present invention.

Referring now to FIG. 2, there is shown a flow of processes carried out by a system 20 formed in accordance with one exemplary embodiment of the present invention. Certain processes carried out by system 20 are preferably executed by one or more processors suitably programmed and implemented in one or more functional units/modules of the system. The collective flow of processes is cooperatively carried out by such processing measures provided for the various functional units of system 20, as illustrated.

System 20 generally encompasses the part selection, parameter selection, optimization, and result exploration portions of the overall component part list optimization flow 10 illustrated in FIG. 1. System 20 includes a part list acquisition unit 200 which suitably accesses and retrieves the given parts list from the available sources in the intended application. The parts list acquisition unit 200 preferably executes as part of the configuration process of the optimization system 20. Depending on the stage of the circuit product design cycle at which the optimization of system 20 is invoked, the acquired part list will differ. When system 20 is invoked at an early stage, such as before schematic design is completed, the unit 20 may acquire a strategic parts list (SPL) containing a set of parts pre-selected for use in the given design even before design tools are utilized.

The circuit product to be designed, for instance, may be of a nature and type previously designed, such that certain use of these SPL parts are established a priori. In addition to parts lists generated directly from design tools, such as via a suitable schematic capture system or PCB layout editor, preliminary parts list may be acquired from the SPL which establish certain parts pre-design. The anticipated circuit product may be based for instance on pre-existing basic architecture for which many of the parts contributing to the design may already be known. Early optimization is preferably invoked for on this preliminary parts list, when available.

Parts may also be acquired as such early stages simply from a shopping cart type of pre-filled by a design from an available supply of parts for inclusion in the design. If the optimization system 20 were invoked at a later stage of the design cycle, such as after schematic design creation, the BOM generated at that point may be acquired. At even later stages of the design cycle, a BOM updated or otherwise revised by a vendor may be acquired as needed by the unit 200.

Figure 2A:
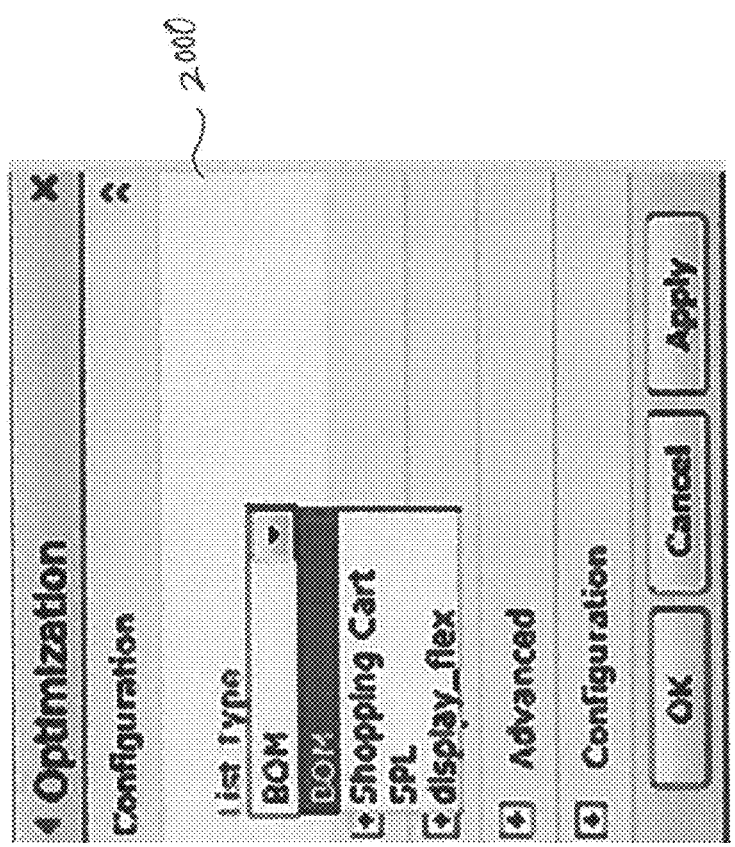
FIG. 2A is a graphic rendering of one example of a graphical user interface generated in connection with parts list acquisition in a particular implementation of the embodiment of FIG. 2.

FIG. 2A illustrates one example of a graphical user interface 2000 programmably implemented by system 20 in connection with the parts list acquisition executed by unit 200. In this embodiment, the available parts lists are shown in a pull down window when suitably prompted by the user. The parts list to acquire may be determined in such user-selected manner. In other implementations, the parts list to acquire may be automatically determined by unit 200.

Depending on the type of circuit product at hand, the criteria most pertinent to its parts list optimization will vary. Consequently, the particular parameter values to optimize over are selectively set based on whether the given circuit product entails analog design, digital design, combined analog/digital design, RF design, high speed design, or otherwise. Moreover, the degree of variation allowed for one or more of the selected parameters is selectively set according to the type and nature of design involved. This allows for flexibility to adapt an optimization run to the given design type and situation, enabling the user to guide the optimization and give certain parameters greater weight with respect to others for an optimization run, and to do so from run to run (for re-optimization).

Referring back to FIG. 2, an optimization parameter selection unit 202 is coupled to receive the parts list acquired by unit 200. This optimization parameter selection unit 202 preferably guides a user to select one or more parameters available for the individual parts in the acquired parts list over which to optimize. For values-based optimization, as described in preceding paragraphs, these may be suitable parameters such as a given part's characteristic value (for example, resistance, capacitance, . . . ), tolerance rating, power rating, cost, and the like. The parameters selected are preferably displayed in the recomposed parts list containing an optimized set of part numbers. Additionally, other parameters not participating in the optimization may also be selected for presentation in the recomposed parts list. The selection of optimization parameters serves typically to screen/filter those parts having to be considered for optimization. Selecting resistance value as an optimization parameter, for example, would exclude capacitors or inductors in the given parts list from unnecessary processing during the optimization.

As part of optimization parameter selection, suitable measures are provided to enable parts in the acquired parts list to be fixed (or locked) to prevent their substitution during optimization. The reason for fixing any of the parts, if at all, will vary depending on the requirements of the intended application.

Preferably, the selection of optimization parameters also enables the range of values for each selected parameter to be adjustably set. That is, the quantitative boundaries over which the optimization is to occur (or the window of corresponding parameter values for the part numbers to be considered during optimization) may be selectively set. A suitable user interface is preferably employed to permit reconfiguration of these and other optimization criteria to be dynamically adjusted 'on the fly' during optimization.

Figure 2B:
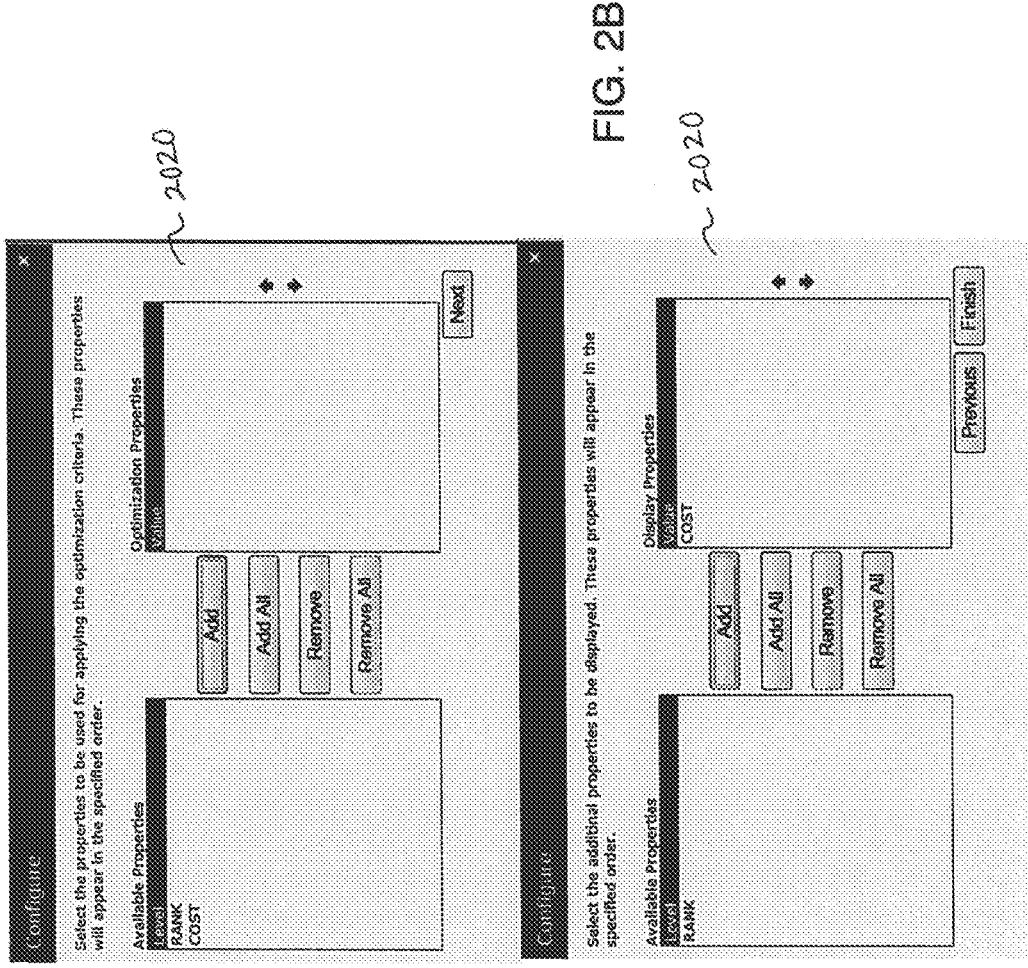
FIG. 2B is a sequence of graphic renderings of one example of a graphical user interface generated in connection with optimization parameter selection in a particular implementation of the embodiment of FIG. 2.

FIG. 2B illustrates one example of a graphical user interface 2020 generated in connection with execution of the optimization parameter selection unit 202, in accordance with an exemplary embodiment of the present invention. More specifically, FIG. 2B illustrates successive screen shots of the graphical user interface 2020. In the first screen shot, a user has selected the characteristic "Value" from the available properties for a particular component. In the second screen shot, the user has additionally selected a "COST" property, leaving just "Level" and "RANK" properties as the available properties remaining for selection.

At block 204, a determination is made by system 20 whether a parameter values-based optimization is to be carried out, or a non-values based optimization, (such as footprint optimization) is to be carried out. If the optimization is to be a parameter values-type based optimization, the permissible variance in each of the selected optimization parameters is determined by unit 206. Unit 206 preferably executes to also selectively set the size of the value variation window (relative to a reference value) to apply when determining the possible unification of different parts (see the annotations 2062, 2064 in FIG. 2D). Preferably, unit 206 selectively sets the maximum variation of each selected parameter value from a reference (which reference may be another part in the parts list) permitted for substitution by that reference, or conversely substitution of the given part for that reference part.

In the disclosed embodiment, no optimization variance is applicable to the footprint-based optimization. Since footprint constitutes a physical representation of a component or device on the given circuit board, its 'value' is represented as a string of characters having a literal, as opposed to quantitative, value. The list of parts is preferably trimmed for footprint optimization by either pattern matching (to a reference field) or range restriction on this footprint-representing string until a suitably trimmed subset of the parts list is obtained.

FIG. 2C illustrates one example of a graphical user interface 2060 programmably implemented by system 20 in connection with the optimization parameter variance selection carried out by unit 206, in accordance with one exemplary embodiment of the present invention. This interface 206 imports those part numbers from the acquired parts list screened by both the selected optimization parameters (the characteristic "Value" and "COST" properties selected via the graphical user interface 2020 of FIG. 2B, and narrowed by the optimization parameter value adjustably set therefor. In this example, the parameter selection enables a screening/filtering of parts according to a specified range of values, in this case the range of 392-701 as indicated by annotation 2064 in FIG. 2D). The user interface permits this range to be graphically adjusted by the user. It also provides an adjustment window, whereby the permitted variance in value may be selectively adjusted—set in this example to "+7%," as indicated by annotation 2062 (in FIG. 2D). A similar range and variance adjustment may be provided for the "costs" property, though not shown in this example.

Referring back to FIG. 2, parts list optimization is carried out by unit 208 for the acquired parts list, over the selected optimization parameters, subject to the optimization value variance selected therefor. As described in following paragraphs, the optimization unit 208 then executes to unify as many of the part numbers based on the selected parameters and permissible variance in their values. This yields the smallest set of part numbers satisfying that criteria. Such optimization may be re-run with different values and combinations of optimization parameter and variance selection.

Figure 2D:
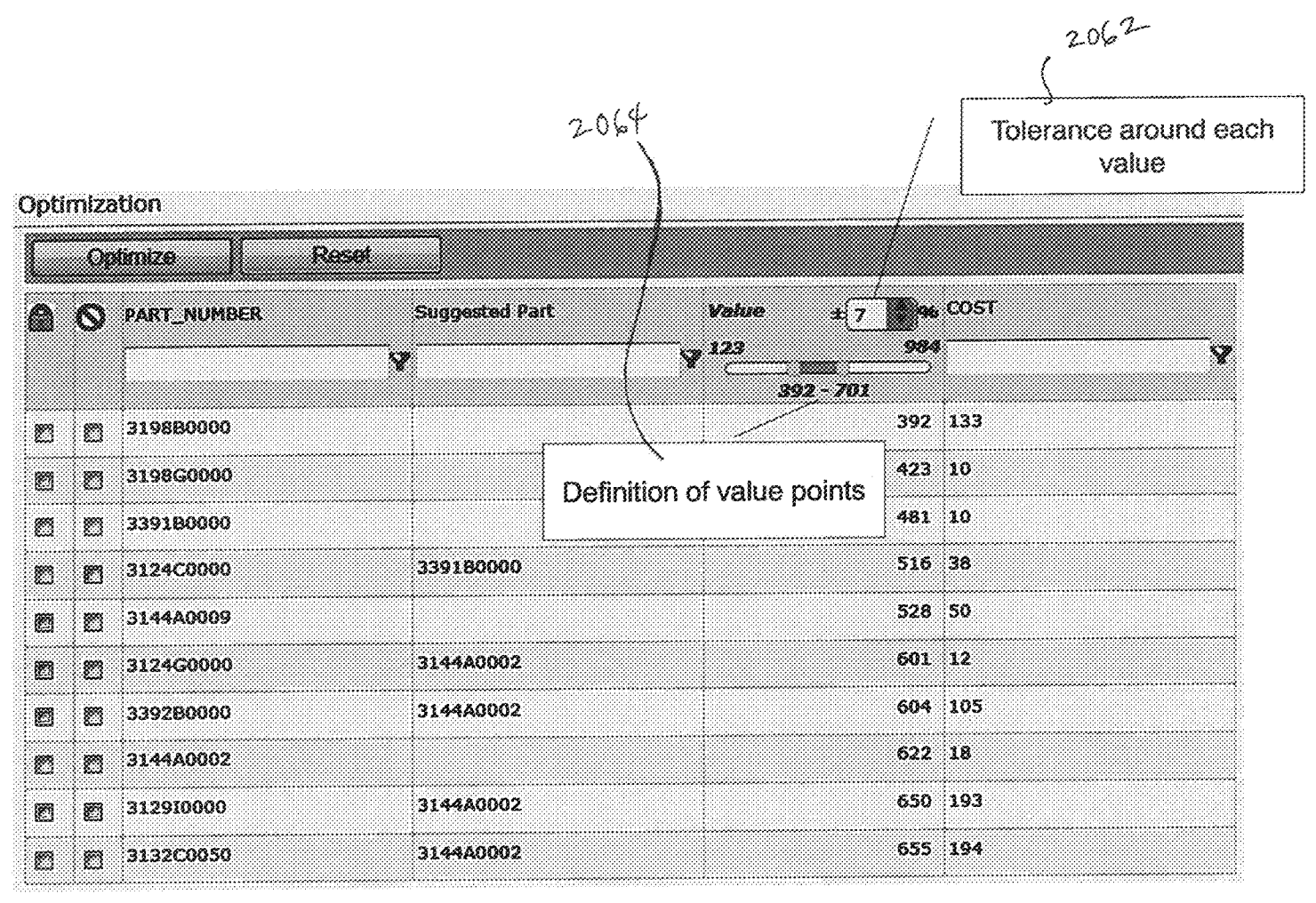

FIG. 2D illustrates the graphical user interface 2060 shown in FIG. 2C, but updated with results following optimization. The display includes suggested parts substitutions for certain of the listed parts. In the example shown, the optimization carried out over the characteristic value property within the range of 392-701 and mutual variation of +7% indicates that part number 312400000 may be substituted for by part number 339180000. This is because the value 516 for part number 312400000 is within 7% of the value for part number 339180000. Likewise, substitution is suggested for part numbers 3124G0000, 3392B0000, 312910000, and 3132C0050 all with the suggested part number 3144A0002. This is because each of the part numbers 3124G0000-3132C0050 (whose values range between 601-655) is within 7% in value of the suggested substitute part number 3144A0002 (having a value of 622). Although displayed in this example, cost is not factored into this optimization. Had it been selected as an optimization parameter—via the user interface illustrated in FIG. 2B, for instance—it could have participated in the optimization to substitute a higher cost part with a lesser cost part where possible (unless doing so prevents reduction of total part numbers).

At block 210 of FIG. 2, the results of optimization 208 are either automatically or manually analyzed to suit the requirements of the intended application. Preferably the optimization results are analyzed by the user, and the optimization unit 208 re-executed if needed to re-run the optimization, as indicated at block 212.

FIG. 2E illustrates a portion of a sample BOM generated upon re-running the optimization results with different criteria to obtain a different result set. In this case, the previous suggested substitution of part number 3124C0000 is removed, and the part number 3124C0000 is itself suggested as a substitute for part number 3144A0009. Additionally, the previously suggested substitution of part number 3132C0050 with part number 3144A0002 is removed, and that part number 313200050 is instead suggested as a substitution for part number 3151AB000 as shown.

Once an acceptable optimization result set is obtained, that result set is sent to the schematic design or other appropriate source of expertise at block 214 to either accept or reject the suggested part substitutions at block 216. Preferably, the suggested substitutions may be individually accepted or rejected. Any accepted suggestion is incorporated by updating at block 218 the source data in question, be it the SPL, shopping cart, BOM (for schematic or physical design, or the like). The option to re-optimize is preferably made available at block 220. If that option is selected, the process starts again by suitably executing the parts list acquisition unit 200. Otherwise, the process ends at block 222.

Turning to FIG. 3, yet another example of a graphical user interface 3062 is generated by system 10 in accordance with another exemplary embodiment of the present invention is illustrated. In this example, the listed part numbers are for resistor components, with the optimization parameters selected to be characteristic resistance Value, Power rating, and Tolerance. Graphical adjustment measures are provided as shown for the user's adjustable setting of value points which define the range boundaries for each value by which to screen/filter out those parts to be optimized. Graphically adjustable measures are also provided for each parameter for the user's selective setting of each parameter's permissible variance in value (0-10% in this example).

FIG. 4 illustrates a portion of another sample parts list preliminarily recomposed to include a set of suggested parts substitutions for optimization. The suggested results reflect optimization on the characteristic value and power rating parameters, with respective variances set a ±10% and ±20%. If the suggested parts substitutions are accepted, the part numbers would be reduced from a total of 10 disparate parts to a total of six disparate parts.

Referring to FIG. 5A, there is shown for illustrative purposes a portion of a sample circuit product BOM. In the example shown, the BOM portion includes in the set of listed materials a plurality of resistor components identified by the part numbers CDN001, CDN002, . . . , CDN010, each appearing in the circuit product in certain corresponding quantities (not shown). These disparate resistor parts differ in their resistance values and tolerance ratings, as well as cost. But some parts are similar to certain others in one or more of the value/tolerance rating/cost parameters. The resistor parts in this illustrative portion of the BOM is preferably grouped together and sorted according to the parametric values selected to optimize the parts over, namely: resistance value, tolerance rating, and cost.

Figure 5B:
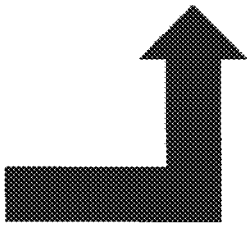
FIG. 5B is an illustrative diagram showing a preliminarily recomposed portion of the sample bill of materials shown in FIG. 5A following optimization according to one set of optimization criteria, followed by a fully composed version thereof generated upon acceptance of optimization results.

FIG. 5B illustrates a re-constituted portion of the original BOM shown in FIG. 5A after value optimization is carried out thereon. In this example, value optimization is carried out on just the resistance value, with the optimization variance set at 5%. FIG. 5B illustrates an intermediate version of the BOM portion generated by the optimization, which presents suggested part substitutions to best unify and reduce parts numbers. As shown, substitutions are suggested for resistor part numbers CDN001, CDN003, CDN004 with resistor part number CDN002, and substitutions are suggested for resistor parts CDN007 and CDN009 respectively with resistor parts CDN006 and CDN008. The parts substitutions, if adopted and incorporated, would optimize the total part numbers from the original eleven resistor part numbers down to just six resistor part numbers, although the total number of resistor parts would remain unchanged.

At this point, the suggested parts substitutions are preferably just presented as optimization results pending adoption and incorporation into the circuit product design, as described in preceding paragraphs. If and when the suggested parts changes are adopted and incorporated, the affected part numbers are unified and then respective quantities accordingly updated in the final recomposed version of the BOM, as shown in the bottom right hand part of FIG. 5B.

Figure 5C:
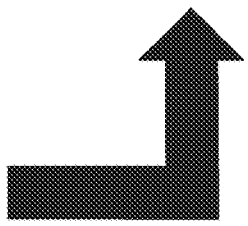
FIG. 5C is an illustrative diagram showing a preliminarily recomposed portion of the sample bill of materials shown in FIG. 5A following optimization according to an alternate set of optimization criteria, followed by a fully composed version thereof generated upon acceptance of optimization results.

In the example illustrated in FIG. 5C, the same BOM portion of FIG. 5A is subjected to optimization over the resistance value and tolerance rating parameters concurrently, with the optimization variance again set at 5% for each parameter. The preliminary, or intermediate version of the recomposed BOM portion presents a suggested substitution for resistor part CDN002 with the resistor part CDN001, the resistor part CDN004 with CDN003, and the resistor part CDN009 with CDN008. If these unifying parts substitutions are adopted and incorporated, the completely recomposed version of this BOM portion resulting from this optimization is shown at the bottom right hand portion FIG. 5C. In this completely recomposed version, the BOM portion now retains eight of the original eleven resistor part numbers, with the original part numbers CDN002, CDN004, and CDN009 removed, and the quantities for the resistor parts CDN001, CDN003, and CDN008 accordingly updated to reflect their respective substitutions of the replaced part numbers.

The optimization unit 208 of system 20 generally executes the selectively-configured optimization in two main stages. As described in preceding paragraphs, optimization is executed on those separately identified parts of the acquired parts list as screened or filtered according to the optimization parameter and optimization variance select units 202, 206. In the first stage of optimization, a number of matching parts is determined for each of the separately identified parts in the filtered list. A match is determined between compared parts when their respective values for each of the selected optimization parameters falls within the variance range selected for that parameter. This stage of processing is made more efficient by ignoring those parts that need not be compared for any suitable reason—such as one of the parts being outside the window of values specified for consideration during optimization configuration), a particular part being specifically marked for exclusion from consideration during optimization, or various other reasons.

The second stage of optimization processing serves to generate suggestions for consolidating part numbers based for instance on the frequency of matches obtained in the first stage. Other suitable measures may be employed for determining and prioritizing possible part number consolidations. For each of the separately identified parts in the illustrated example, any locked parts are accorded first preference; those parts already suggested as a replacement for another part are accorded a second level of preference; and, those parts with the highest number of matching parts—which they can replace—are accorded a third level of preference. In the event that a part is found to have multiple matches with other parts, relative preference is accorded to a part that is not already suggested for replacement. When a replacement/substitution suggestion is made, the frequency count associated with other replacement options involving the particular part in question is accordingly decreased. The part substitutions resulting from this multi-stage process are then presented to the user for consideration during the subsequent results exploration process.

Figures 1, 6A:
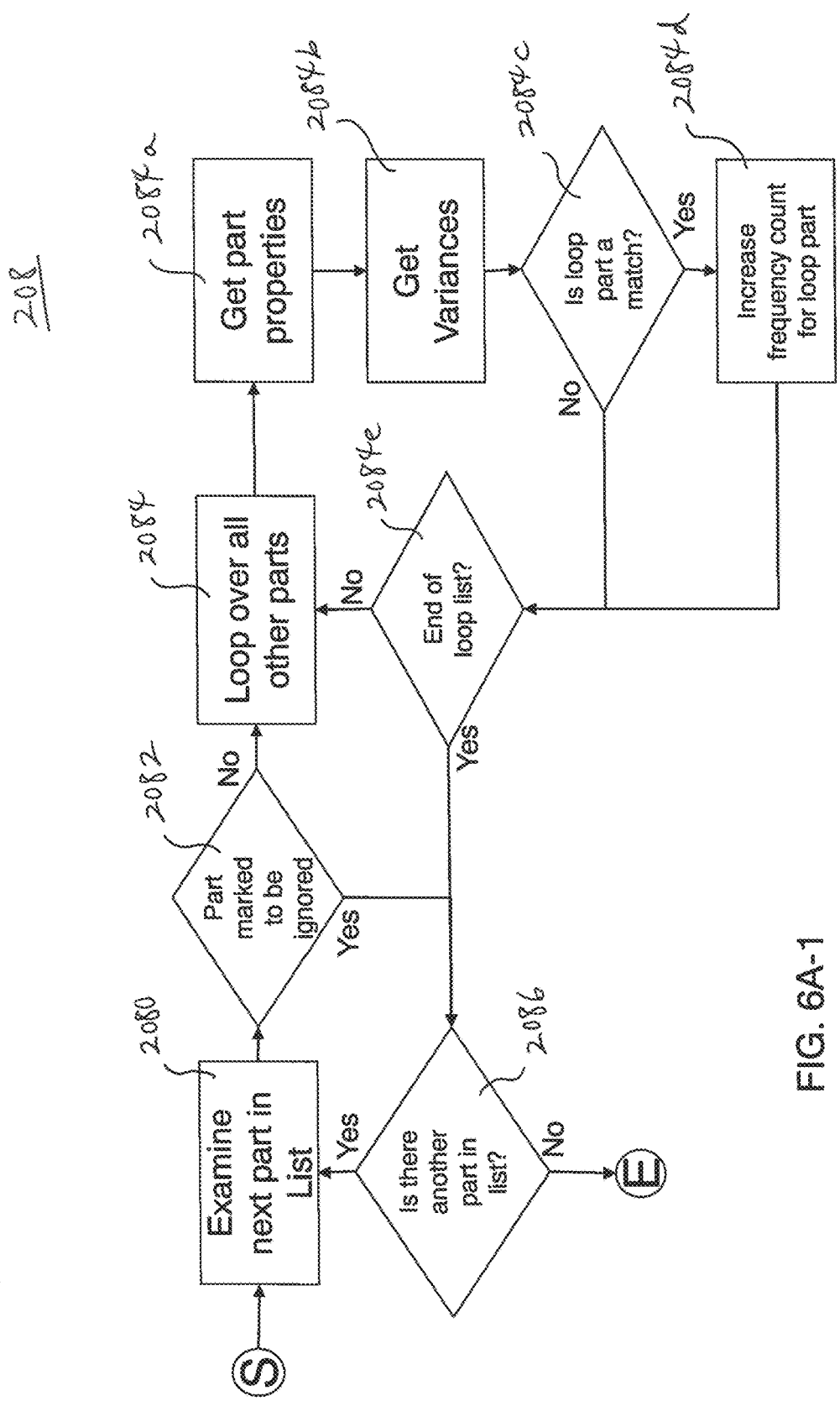
Figures 2, 6A:
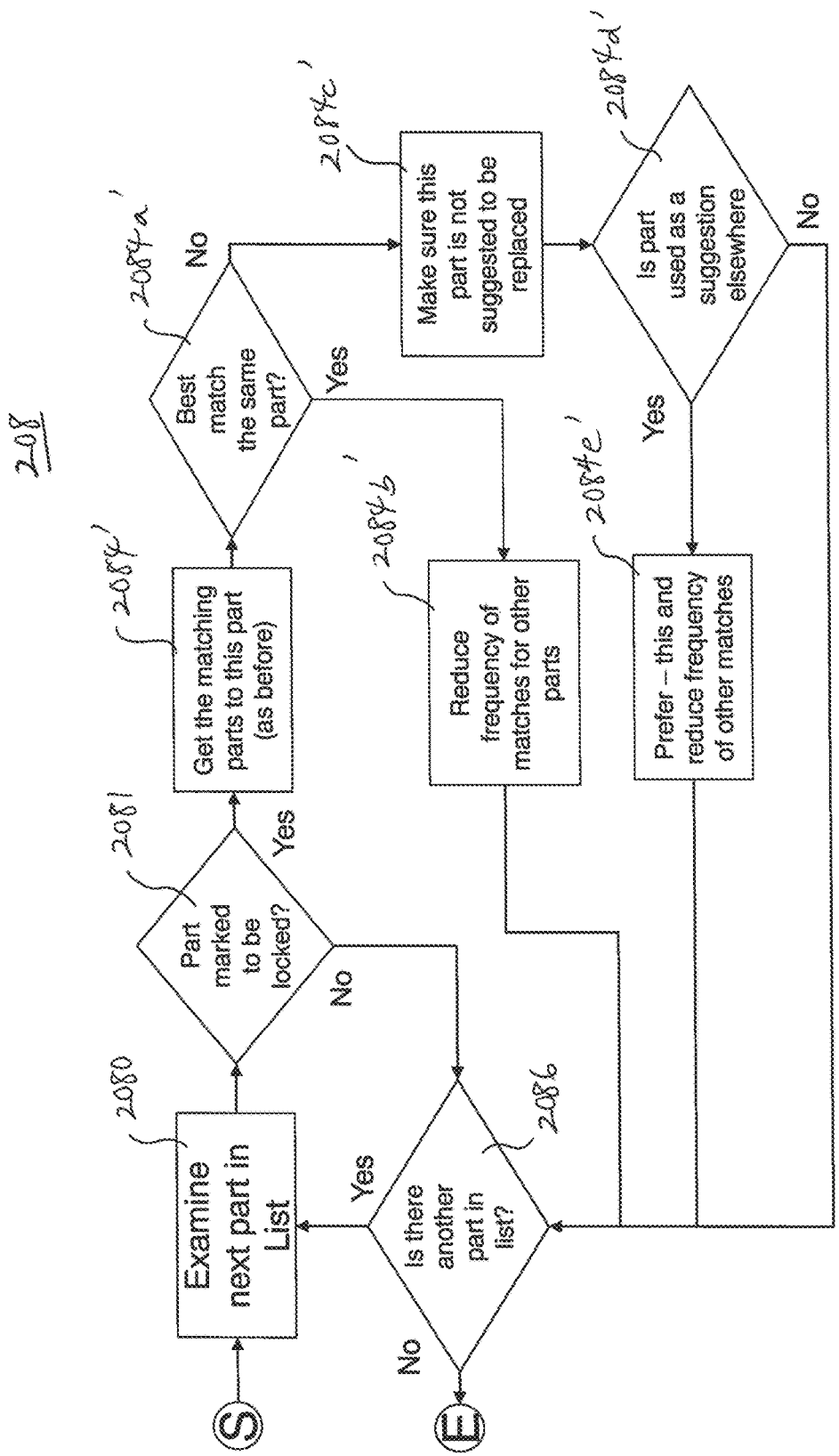

Referring to FIG. 6A-1, the flow of processes carried out by optimization unit 208 in connection with the first stage of optimization processing is illustrated for one exemplary implementation. At block 2080, each of the separately identified parts in the filtered list is examined to determine that block 2082 whether it is marked to be ignored. If it is marked to be ignored, the next part in the list is similarly examined. Otherwise, the flow proceeds for the given part to block 2084 for that part's comparison with all other parts in the filtered list to identify any matches therewith.

At block 2084*a* and 2084*b*, the optimization parameters and variances selected by units 202, 206 of the system 20 are read in to determine at block 2084*c* whether another of the listed parts matches the particular part being compared against, or the reference part. If a match is found, a frequency count for the reference part is incrementally increased at block 2084*d*. This iterative comparison loop continues until all the other parts (with respect to the reference part for the loop) have been exhausted by the loop, as indicated at block 2084*e*. Thereafter, the next part remaining in the filtered list is examined, as indicated at block 2086, and looped comparative process repeated with that next part serving as the reference part for comparison with all the other parts with respect thereto. A match frequency count is thereby obtained for each of the parts in the filtered list not otherwise marked to be ignored.

FIG. 6A-2 illustrates a variation of the first stage of optimization processing carried out for those parts that have been specifically locked for inclusion, such that they are precluded from replacement by a substitute part. A check is made in this regard at block 2081 upon examination of each part. If the part is in fact to be one that has been locked, this part may be used as a possible substitute for other parts, but it may not itself be substituted for. The process thus flows to block 2084' which executes the iteratively looped comparison with the other parts to generate a frequency count, as illustrated in FIG. 6A-1. If the frequency count generated for other parts include the locked part as a best match, that part's frequency count is accordingly reduced, as indicated at block 2084*b*'. At block 2084*c*', suitable measures are taken to insure that a replacement suggestion is not made for replacement of that locked part. A check is made at block 2084*d*' to determine if the locked part is suggested as a substitute part for replacing another. If so, the locked part is accorded preference over other possible substitutes, and the frequency count for other matches accordingly reduced.

Figure 6B:
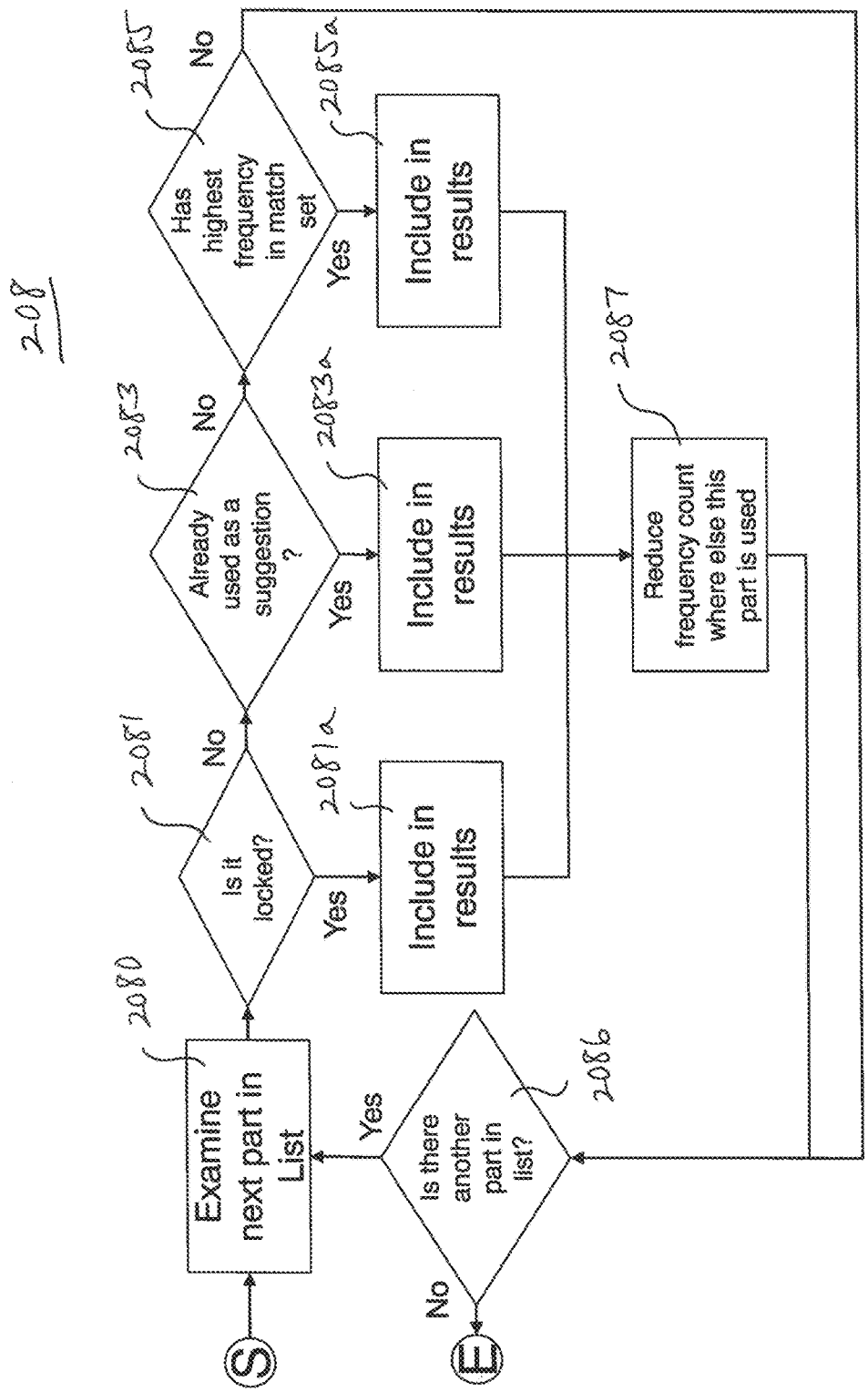
FIG. 6B is a schematic diagram generally illustrating a flow of processes within a second stage of optimization executed by an optimization unit of the parts list optimization system embodiment of FIG. 2 in one exemplary implementation.

FIG. 6B illustrates an exemplary flow of processes carried out by optimization unit 208 for the second stage of optimization by which parts substitution suggestions are generated. At block 2080, each of the parts in the filtered list is examined to determine at block 2081 whether this part is included in the preliminary recomposition of the given list, as indicated at block 2081*a*. The match frequency count for other parts having matches to this locked part is then reduced. If the part being examined is not locked, a check is made at block 2083 as to whether the part is already used as a suggested substitution. If so, this suggested substitution is included in the preliminarily recomposed version of the given parts list, and the frequency count for any other parts having matches to this part is accordingly reduced at block 2087. If the check at block 2083 for the non-locked part indicates that it has not yet been used as a suggested substitute, a check is made at block 2085 as to whether that part has the highest frequency count amongst the remaining parts. If so, its suggestion as a substitute part for the other matching parts is included in the preliminarily recomposed parts list, and the match frequency count for the effected parts accordingly reduced. This process is thereafter repeated for the next of the remaining parts in the filtered list, as indicated at block 2086.

Figure 7:
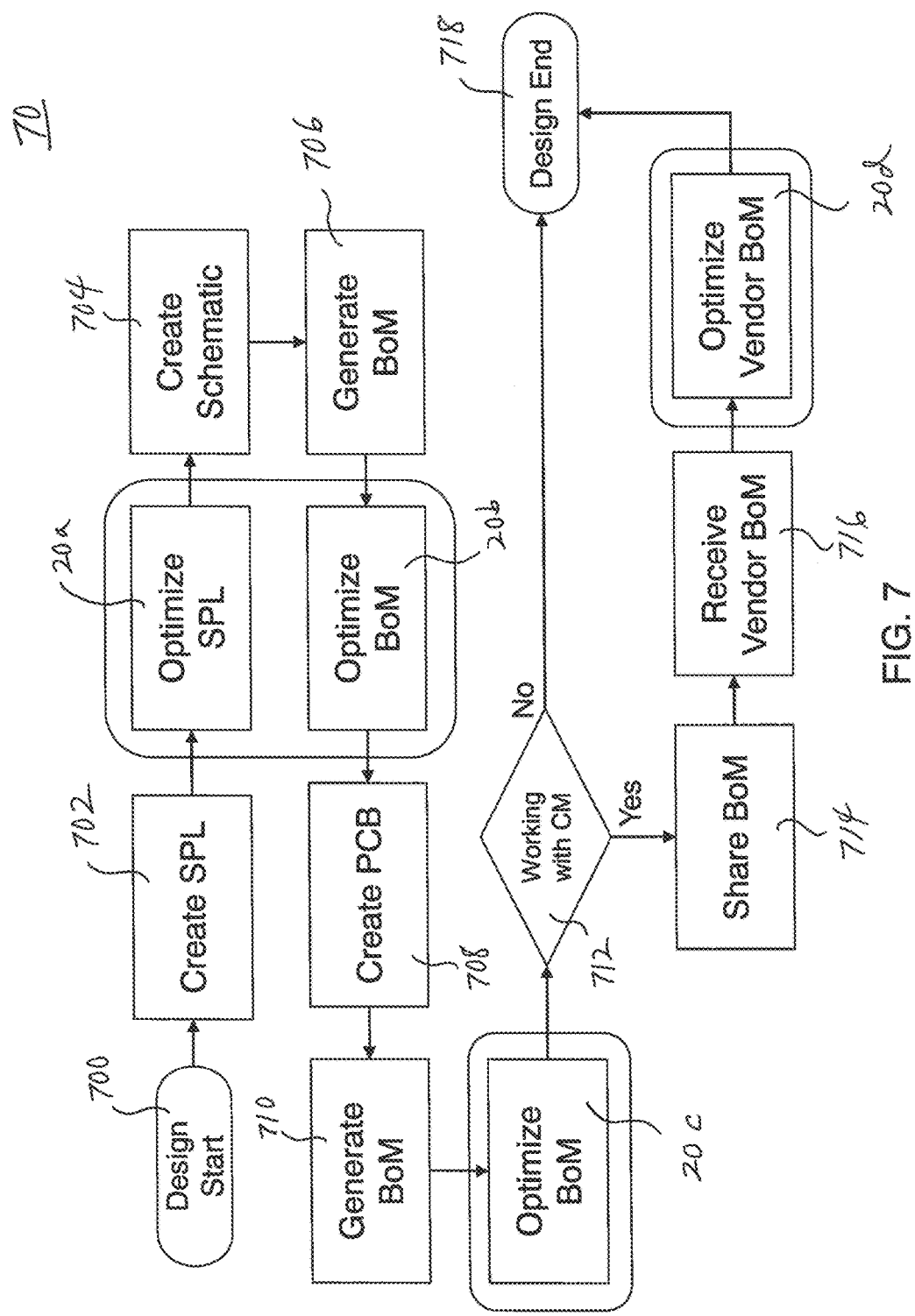
FIG. 7 is a schematic diagram generally illustrating a functional interaction of units in an exemplary system generally carrying out a design cycle for a circuit product employing the parts list optimization system embodiment of FIG. 2; and, FIG. 8 is a block diagram illustrating an exemplary interconnection of units in a processor-based system for implementing the embodiments of systems and methods according to various aspects of the present invention.

Referring now to FIG. 7, an overall circuit product design system 70 is shown which employs the optimization system 20, in accordance with an exemplary embodiment of the present invention. As with FIG. 2, certain processes carried out by system 70 are preferably executed by one or more processors suitably programmed and implemented in one or more functional units/modules of the system. The collective flow of processes is cooperatively carried out by such processing measures provided for the various functional units of system 70, as illustrated.

Circuit product design system 70 in this example begins at block 700, preferably by executing a unit 702 to generate a preliminary parts list, such as in the form of an SPL. A preliminary optimization is then carried out by that block 20*a* by executing the system (such as illustrated in FIG. 2)

by upon acquiring this SPL. Suitable design tools are employed to create a schematic design as indicated at block 704, along with generation of a corresponding BOM, as indicated at block 706. A further optimization 20*b* is carried out by executing system 20 upon acquiring this BOM. The results of this optimization are then explored and suitably incorporated as needed in completing physical layout design which culminates in the creation of a printed circuit board (PCB) as indicated at block 708.

A corresponding BOM is generated at block 710 in view of this physical layout. The BOM generated at block 710 is typically an update of the BOM generated following the culmination of logic level design in the creation of a design schematic. The BOM generated at block 710 is then acquired for a further optimization 20*c*. The recomposed version of the BOM generated following this optimization 20*c* is then passed to one or more vendors (denoted contract manufacturers (CM) in this example) if any, for manufacture. Where such outside vendor is used, the recomposed BOM is shared with that vendor, as indicated at block 714. Occasionally, a vendor for various reasons may suggest modifications affecting one or more part numbers in the BOM, as indicated at block 716. In that case, the modified vendor BOM is again optimized at block 20*d* by executing the optimization system 20 upon acquisition of such vendor BOM. The recomposed vendor BOM is then explored and suitably incorporated into the design, to end the circuit product design at block 718.

The product design cycle optimization of system 70 facilitates productive collaboration by users involved in different stages of the design cycle to produce a highly efficient design for fabrication. System 70 aids design engineers who create logic level schematic designs of printed circuit boards, for instance, to effectively collaborate with component engineers, project managers, and others who focus more on the process of actually realizing a physical implementation of the PCB and best configure the design for smooth and efficient manufacture. Among other things, system 70 provides capabilities for collaborative interaction around data management, around data organization, around advance parts selection, around locking specific part designs, around issue tracking, and other such design concerns.

Figure 8:
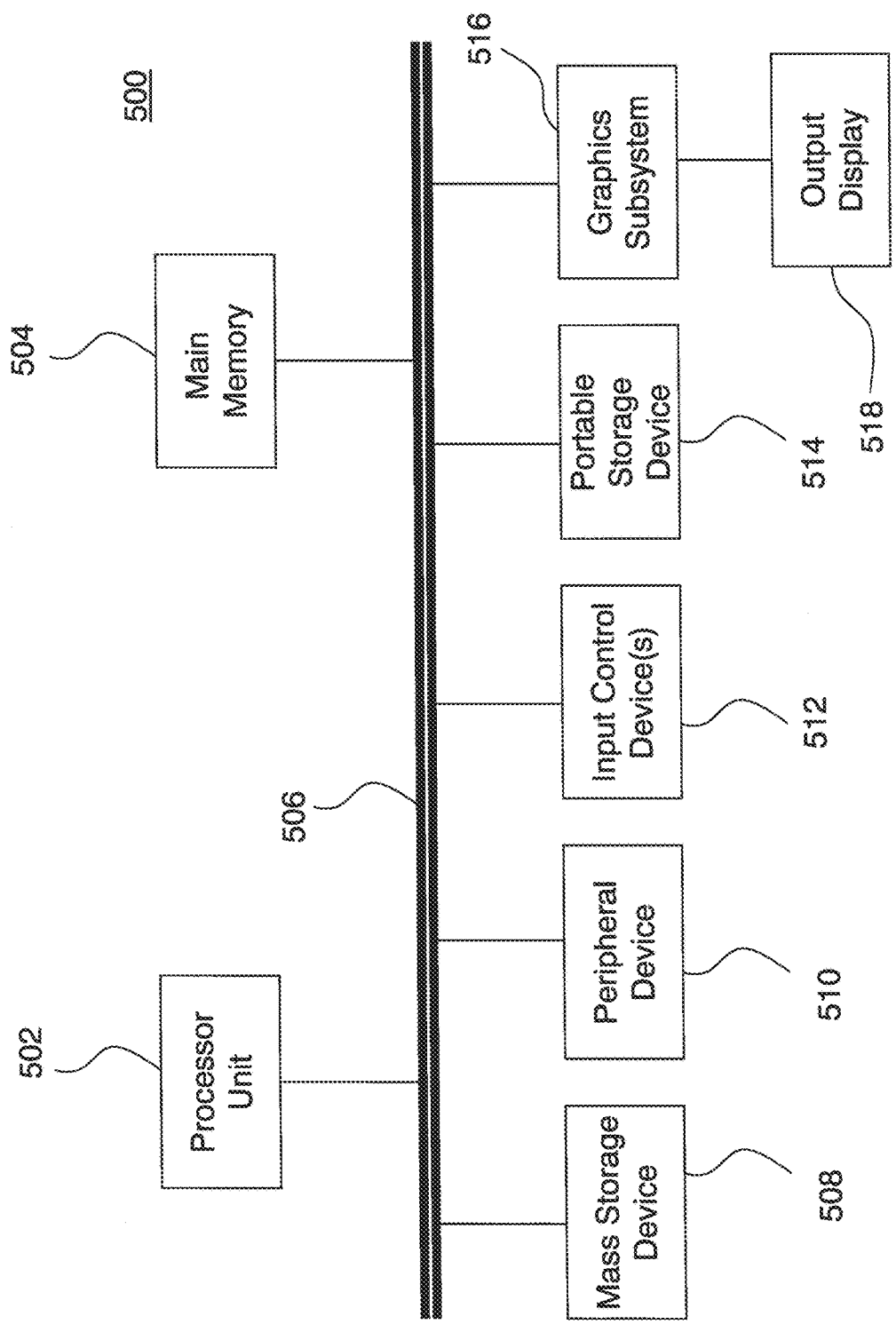

FIG. 8 illustrates a block diagram of an exemplary computer system which may be employed to implement various embodiments in accordance with the present invention. The illustrative computer system 500 includes a processor unit 502, a main memory 504, an interconnect bus 506, a mass storage device 508, peripheral device(s) 510, input control device(s) 512, portable storage drive(s) 514, a graphics subsystem 516, and an output display 518. Processor unit 502 may include a single microprocessor or a plurality of microprocessors for configuring computer system 500 as a multi-processor system. Main memory 504 stores, in part, instructions and data to be executed by processor 502. Main memory 504 preferably includes banks of dynamic random access memory (DRAM) as well as high-speed cache memory.

For simplicity, the components of computer system 500 are connected via interconnect bus 506. However, computer system 500 may be connected through one or more other data transport measures of any suitable type known in the art, both wired and wireless. For example, processor unit 502 and main memory 504 may be connected via a local microprocessor bus and mass storage device 508, peripheral device(s) 510, portable storage medium drive(s) 514, and graphic subsystem 516 may be connected via one or more input/output (I/O) buses. Mass storage device 508, which may be implemented with a magnetic disk drive, an optical disk drive, a solid state device, or an attachment to network storage, is non-volatile storage device for storing data, databases, and instructions, to be used by processor unit 502. In a software embodiment, mass storage device 508 may store the software to load it into main memory 504. Mass storage device 508 may include any form of non-transitory computer readable media and may include multiple forms of different media.

Portable storage medium drive 514 operates in conjunction with a portable non-volatile storage medium such as a floppy disk, a compact disk read only memory (CD-ROM), a digital versatile disk read only memory (DVD-ROM), or a memory card such as e.g. Secure Digital High Capacity (SDHC), to input and output data and code to and from the computer system 500. In certain embodiments, the software is stored on such a portable medium, and is input to computer system 500 via portable storage medium drive 514. Peripheral device(s) 510 may include any suitable type of computer supported device known in the art, such as an input/output (I/O) interface, to add additional functionality to computer system 500. For example, peripheral device(s) 510 may include a network interface card to interface computer system 500 to a network.

Input control device(s) 512 provide a portion of the user interface for a computer system 500 user. Input control device(s) 512 may include an alphanumeric keypad for inputting alphanumeric and other key information; and a cursor control device such as a mouse, a track pad or stylus, or cursor direction keys.

In order to display textual and graphical information, computer system 500 contains graphic subsystem 514 and output display(s) 518. Output display 518 may include a cathode ray tube (CRT) display, liquid crystal display (LCD), plasma, digital light processing (DLP), or active matrix organic light emitting diode (AMOLED) display. Graphic subsystem 516 receives textual and graphical information and processes the information for output to display 518.

In a software implementation, a method formed in accordance with an exemplary embodiment of the present invention includes a plurality of computer executable instructions, to be implemented on a computer system. Prior to loading in the computer system, the software may reside as encoded information on a computer-readable tangible or non-transitory medium such as a magnetic floppy disk, a magnetic tape, CD-ROM, DVD-ROM, flash memory, or any other suitable computer readable medium.

In a hardware implementation, such a system in accordance with an exemplary embodiment of the present invention may be realized in any suitable computer based platform known in the art. For example, the system may comprise suitable storage media and one or more dedicated processors or shared processors executing/controlling other functions, wherein the employed processor(s) is programmably configured with processor instructions for performing the functions described herein. Suitable circuits may also be developed to execute certain aspects of these functions.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A system for adaptively optimized recomposition of a parts list for fabrication of an electronic circuit product comprising:
   a parts list acquisition portion executing on a processor to form a parts list containing a plurality of constituent parts entries read from one or more predetermined sources, the parts entries being respectively identified in the parts list by different corresponding part identifiers;
   an optimization unit coupled to said parts list acquisition portion, said optimization unit executing on a processor to comparatively determine matches between parts entries for parts having different physical properties to generate one or more suggested parts substitutions, said matches determined based on at least one optimization parameter, said optimization unit intermediately recomposing the parts list by incorporating therein at least one of the suggested parts substitutions to adaptively consolidate matched pairs of the parts entries; and,
   a results exploration unit coupled to said optimization unit, said results exploration unit actuating a user interface portion to render the intermediately recomposed parts list generated by said optimization unit, said exploration unit alternatively incorporating or discarding each of the suggested parts substitutions in the intermediately recomposed parts list responsive to user input to generate a fully recomposed parts list,
   wherein the incorporated parts substitutions thereby prescribe replacement of one part with another part of different physical property in the electronic circuit product for fabrication, and
   wherein, when a suggested parts substitution prescribes replacing a first part with a second part, the first part is removed from consideration as a replacement in any suggested parts substitution.

2. The system as recited in claim 1, further comprising an optimization configuration portion coupled to said optimization unit, said optimization configuration portion including:
   an optimization parameter selection unit maintaining a user interface for selection of one or more optimization parameters for defining a match between the different parts entries of the parts list compared by said optimization unit; and,
   an optimization parameter variance selection unit coupled to said optimization parameter selection unit, said optimization parameter variance selection unit maintaining a user interface to selectively set for the value of each selected optimization parameter a range of variance permitted for the compared parts entries to remain matched.

3. The system as recited in claim 2, wherein the parts list is filtered to selectively include therein a portion of the constituent parts entries having a predefined value for each selected optimization parameter.

4. The system as recited in claim 1, wherein said parts list acquisition portion executes to merge parts entries read from a plurality of predetermined sources to form a merged parts list for roll-up parts list optimization thereof.

5. The system as recited in claim 1, wherein said optimization unit executes:
   a first stage of optimization to iteratively determine for a group of parts entries within the parts list a count of matches between each parts entry within the group with respect to the other parts entries within the group; and,
   a second stage of optimization selectively identifying the parts list suggestions from matched pairs of the parts entries responsive to a relative ranking of the count of matches corresponding to the parts entries.

6. The system as recited in claim 5, wherein said optimization unit executes to selectively assign a plurality of preference levels to the parts entries of the parts list, wherein:
   a first preference level is assigned to each parts entry preselected to be locked against substitution;
   a second preference level is assigned to each parts entry already suggested as a substitute for another parts entry matched thereto; and,
   a third preference level is maintained for a parts entry while said parts entry maintains the highest count of matches.

7. A method for adaptively optimized recomposition of a parts list for fabrication of an electronic circuit product comprising:
   executing a processor to form a parts list containing a plurality of constituent parts entries acquired from one or more predetermined sources, the parts entries being respectively identified in the parts list by different corresponding part identifiers;
   executing a processor to adaptively optimize the parts list, the optimization including comparatively determining matches between parts entries for parts having different physical properties to generate one or more suggested parts substitutions, said matches determined based on at least one optimization parameter;
   intermediately recomposing the parts list by incorporating therein at least one of the suggested parts substitutions to adaptively consolidate matched pairs of the parts entries;
   actuating a user interface portion to render the intermediately recomposed parts list;
   exploring the intermediately recomposed parts list as rendered to alternatively incorporate or discard each of the suggested parts substitutions therein responsive to user input; and,
   generating a fully recomposed parts list based on said exploration of the intermediately recomposed parts list,
   wherein the incorporated parts substitutions thereby prescribe replacement of one part with another part of different physical property in the electronic circuit product for fabrication, and
   wherein, when a suggested parts substitution prescribes replacing a first part with a second part, the first part is removed from consideration as a replacement in any suggested parts substitution.

8. The method as recited in claim 7, further comprising selective configuration of the optimization, the selective configuration including:
   maintaining a user interface for selection of one or more optimization parameters for defining a match between the different parts entries of the parts list compared for optimization; and,
   maintaining a user interface for selective setting of a variance in value permitted for each selected optimization parameter, the variance defining a range of values permitted for the compared parts entries to remain matched.

9. The method as recited in claim 8, wherein the parts list is filtered to selectively include therein a portion of the constituent parts entries having a predefined value for each selected optimization parameter.

10. The method as recited in claim 7, wherein said parts list acquisition merges parts entries read from a plurality of predetermined sources to form a merged parts list for roll-up parts list optimization thereof.

11. The method as recited in claim 7, wherein said optimization includes:
   a first stage of optimization to iteratively determine for a group of parts entries within the parts list a count of matches between each parts entry within the group with respect to the other parts entries within the group; and,
   a second stage of optimization selectively identifying the parts list suggestions from matched pairs of the parts entries responsive to a relative ranking of the count of matches corresponding to the parts entries.

12. The method as recited in claim 11, wherein said optimization selectively assigns a plurality of preference levels to the parts entries of the parts list, wherein:
   a first preference level is assigned to each parts entry preselected to be locked against substitution;
   a second preference level is assigned to each parts entry already suggested as a substitute for another parts entry matched thereto; and,
   a third preference level is maintained for a parts entry while said parts entry maintains the highest count of matches.

13. A system for designing an electronic circuit product comprising:
   an optimization portion including:
      an optimization unit executing on a processor for adaptively optimized recomposition of a parts list containing a plurality of constituent parts entries passed thereto, said optimization unit executing to comparatively determine matches between parts entries for parts having different physical properties to generate one or more suggested parts substitutions, said matches determined based on at least one preselected optimization parameter, said optimization unit intermediately recomposing the parts list by incorporating therein at least one of the suggested parts substitutions to adaptively consolidate matched pairs of the parts entries, and,
      a results exploration unit coupled to said optimization unit, said results exploration unit actuating a user interface portion to render the intermediately recomposed parts list generated by said optimization unit, said exploration unit alternatively incorporating or discarding each of the suggested parts substitutions in the intermediately recomposed parts list responsive to user input to generate a fully recomposed parts list;
   a parts list acquisition portion executing on a processor to form a preliminary parts list containing a plurality of preliminary parts entries read from one or more predetermined sources, the preliminary parts entries being respectively identified in the preliminary parts list by different corresponding part numbers, said parts list acquisition portion executing to pass the preliminary parts list to said optimization portion for optimization thereby;
   a schematic design portion coupled to said optimization portion to receive therefrom a recomposition of the preliminary parts list and generate a schematic design of the electronic circuit product, said schematic design portion generating a first bill of materials for the schematic design containing a plurality of first parts entries, said schematic design portion executing to pass the first bill of materials to said optimization portion for optimization thereby; and,
   a layout design portion coupled to said optimization portion to receive therefrom a recomposition of the first bill of materials and generate a physical layout design of the electronic circuit product, said layout design portion generating a second bill of materials for the physical layout design containing a plurality of second parts entries, said layout design portion executing to pass the second bill of materials to said optimization portion for optimization to generate an adaptive recomposition thereof,
   wherein parts substitutions incorporated into the adaptive recomposition of the second bill of materials thereby replace prescribe replacement of one part with another part of different physical property in the electronic circuit product for fabrication, and
   wherein, when a suggested parts substitution prescribes replacing a first part with a second part, the first part is removed from consideration as a replacement in any suggested parts substitution.

14. The system as recited in claim 13, further comprising a vendor share unit executing to merge parts entries read from a plurality of recomposed second bills of materials for different electronic circuit products to form a composite bill of materials for a vendor, said optimization portion executing roll-up parts list optimization on the vendor-revised version of the composite bill of materials.

15. The system as recited in claim 14, wherein said optimization unit executes:
   a first stage of optimization to iteratively determine for a group of parts entries within the parts list a count of matches between each parts entry within the group with respect to the other parts entries within the group; and,
   a second stage of optimization selectively identifying the parts list suggestions from matched pairs of the parts entries responsive to a relative ranking of the count of matches corresponding to the parts entries.

16. The system as recited in claim 13, further comprising an optimization configuration portion coupled to said optimization portion, said optimization configuration portion including:
   an optimization parameter selection unit maintaining a user interface for selection of one or more optimization parameters for defining a match between the different parts entries of the parts list compared by said optimization unit; and,
   an optimization parameter variance selection unit coupled to said optimization parameter selection unit, said optimization parameter variance selection unit maintaining a user interface to selectively set for the value of each selected optimization parameter a range of variance permitted for the compared parts entries to remain matched.

17. The system as recited in claim 13, wherein said optimization unit executes to selectively assign a plurality of preference levels to the parts entries of the parts list, wherein:
   a first preference level is assigned to each parts entry preselected to be locked against substitution;
   a second preference level is assigned to each parts entry already suggested as a substitute for another parts entry matched thereto; and, a third preference level is maintained for a parts entry while said parts entry maintains the highest count of matches.

* * * * *